(12) United States Patent
Lin

(10) Patent No.: US 9,481,554 B2
(45) Date of Patent: Nov. 1, 2016

(54) MONITORING APPARATUS AND CONTROL METHOD OF CRANE HOISTING VERTICAL DEVIATION ANGLE

(71) Applicant: Handing Lin, Fuzhou (CN)

(72) Inventor: Handing Lin, Fuzhou (CN)

(73) Assignee: Handing Lin, Fuzhou (CN)

( * ) Notice: Subject to any disclaimer, the term of this patent is extended or adjusted under 35 U.S.C. 154(b) by 77 days.

(21) Appl. No.: 14/353,904

(22) PCT Filed: Oct. 13, 2012

(86) PCT No.: PCT/CN2012/082894
§ 371 (c)(1),
(2) Date: Apr. 24, 2014

(87) PCT Pub. No.: WO2013/075556
PCT Pub. Date: May 30, 2013

(65) Prior Publication Data
US 2014/0299564 A1    Oct. 9, 2014

(30) Foreign Application Priority Data

Nov. 25, 2011 (CN) .......................... 2011 1 0387199

(51) Int. Cl.
| | |
|---|---|
| *G01C 9/04* | (2006.01) |
| *B66C 23/90* | (2006.01) |
| *B66C 13/46* | (2006.01) |
| *B66C 13/08* | (2006.01) |
| *B66C 13/06* | (2006.01) |
| *G01B 21/22* | (2006.01) |

(52) U.S. Cl.
CPC ............... *B66C 23/90* (2013.01); *B66C 13/06* (2013.01); *B66C 13/085* (2013.01); *B66C 13/46* (2013.01); *G01B 21/22* (2013.01); *G01C 9/04* (2013.01); *G01B 2210/58* (2013.01)

(58) Field of Classification Search
CPC ..... B66C 23/90; B66C 13/06; B66C 13/085; B66C 13/46; G01B 2210/58; G01B 21/22; G01C 9/04
USPC .......................................................... 212/273
See application file for complete search history.

(56) References Cited

U.S. PATENT DOCUMENTS

| | | | | |
|---|---|---|---|---|
| 6,126,023 A | * | 10/2000 | Durrant-Whyte | ....... B66C 13/06 212/274 |
| 2011/0187548 A1 | * | 8/2011 | Maynard | ............... B66C 15/045 340/685 |

(Continued)

FOREIGN PATENT DOCUMENTS

CN          101650174 A   *   2/2010

*Primary Examiner* — Emmanuel M Marcelo
(74) *Attorney, Agent, or Firm* — Gokalp Bayramoglu

(57) ABSTRACT

Disclosed in the present invention is a monitoring apparatus of crane hoisting vertical deviation angle. The monitoring apparatus uses a dual-axis inclinometer to measure the vertical deviation angle of the lifting pulley block of a crane, wirelessly transmits the angle signal, and dynamically displays the angle by a control display. The control method adopts the monitoring apparatus mentioned above. The monitoring apparatus thereof fixes a measuring platform on the outside of the guard plate of the movable pulley of the lifting pulley block, and the dual-axis inclinometer is fixed on the measuring platform surface, which becomes a horizontal plane when the crane hoisting vertical deviation angle is 0 degree. The present invention can detect and monitor the verticality of the lifting pulley block in real time, and avoid the risk of non-vertical crane hoisting.

4 Claims, 4 Drawing Sheets

(56) References Cited

U.S. PATENT DOCUMENTS

| | | | | |
|---|---|---|---|---|
| 2012/0144682 A1* | 6/2012 | Vinati | ............... | B66C 13/46 33/263 |
| 2013/0103271 A1* | 4/2013 | Best | ............... | G06F 19/00 701/50 |
| 2013/0112643 A1* | 5/2013 | Lecours | ............... | B66C 13/18 212/276 |
| 2014/0224755 A1* | 8/2014 | Eriksson | ............... | B66C 13/06 212/273 |
| 2015/0161872 A1* | 6/2015 | Beaulieu | ............... | B66C 13/40 340/686.6 |

* cited by examiner

MONITORING APPARATUS AND CONTROL METHOD OF CRANE HOISTING VERTICAL DEVIATION ANGLE

This application claims priority to PCT Application No. PCT/CN2012/082894 filed on Oct. 13, 2012, which claims priority to China Application No. 201110387199.4 filed on Nov. 25, 2011, which are incorporated herein by reference in their entirety.

FIELD OF THE INVENTION

The present application relates to the technical field of crane hoisting, and more specifically to a monitoring apparatus of crane hoisting vertical deviation angle.

BACKGROUND OF THE INVENTION

Cranes require vertical lifting, but crane operators cannot determine whether the hook is in the vertical position. Thus, the detection of the verticality of a crane hook becomes an important issue that must be urgently resolved, whether it is for eliminating the possibility of damaging the surrounding equipment or injuring the nearby personnel by the deflection of the weight caused by the eccentrically lifting hook or other causes, achieving automatic operation of a crane, or implementing safe hoisting and reducing crane collaborative hoisting risk. In order to reduce the risk of crane collaborative hoisting, the applicant has put forward an idea of dynamically displaying the crane collaborative hoisting risk for the collaborative operator. Currently, angle sensors are always used to detect the deviation angle of the hook wire in order to find out the verticality condition of the crane lifting pulley block or the crane hook. For one example, an angular measurement device realizes the two-dimensional detection of the crane hook wire, as is shown in FIG. 2, where two U-shaped frames, UX and UY, are set in two mutually perpendicular directions. A hook wire C with a hanging weight L runs across both frames, which are kept in touch with each other. Two angle sensors, EX and EY, are installed on the rotation shafts of U-shaped frames, UX and UY, respectively. The angle sensors output deviation signals when rotating with the rotation shafts of the U-shaped frames and when hook wire C deviates from plumb. For another example, a device for detecting the deviation angle of crane hook wire is shown in FIG. 3. A sleeve 2 is set outside of the hook wire 3, which is located in the fixed pulley end of the crane jib head 1. An angle sensor 4 is installed on the outer wall of the sleeve 2. An anti-rotating mechanism 5 restricting the rotation of the sleeve 2 is installed between the crane jib head 1 and the sleeve 2. The angle sensor 4 outputs the deviation signal by deflecting with the sleeve 2 when hook wire 3 deviates from plumb. All above mentioned devices cannot detect the hoisting vertical deviation angle of crane accurately because there is an inherent uncertain deviation in the hook wire itself.

SUMMARY OF THE INVENTION

Single crane hoisting and collaborative crane hoisting both have big risks for the reasons below. Cranes have poor stability, so crane hoisting vertical deviation angle shall not be more than 3 degrees. A swing weight may damage its surrounding equipment and injure nearby personnel when it is not hoisted vertically, especially when a non-vertical hoist at a high elevation breaks the normal load distribution of the crane and the driver cannot determine whether the lifting pulley block of the crane is in vertical position due to lack of a device displaying its vertical hoist. When the driver operates a hoist under the command of a hoisting commander who monitors the hoisting weight, the command is neither timely nor accurate. Therefore, in the present application, two monitoring apparatuses are provided, which can avoid the risk in single crane hoisting and collaborative crane hoisting. First, the present invention provides an apparatus monitoring crane hoisting vertical deviation angle, which measures the vertical deviation angle of the lifting pulley block of a crane, and displays the crane hoisting vertical deviation angle in the crane cab. Secondly, the present invention provides an apparatus monitoring crane collaborative hoisting vertical deviation angle, which measures the vertical deviation angle of the lifting pulley block of the crane, and displays the crane hoisting vertical deviation angle not only in the crane cab but also at a collaborative monitoring point to help achieve cooperative hoisting.

The vertical deviation angle of the lifting pulley block of a crane (hereinafter referred to as the vertical deviation angle) is equal to the angle of the plane perpendicular to the lifting pulley block deviating from the horizontal plane, with the angle being measured by a dual-axis inclinometer that is placed on the plane perpendicular to the lifting pulley block. Therefore, the monitoring apparatuses fixes a measuring platform on the outside of the guard plate of the movable pulley of the lifting pulley block of a crane, and the measuring platform surface becomes a horizontal plane when the crane hoisting vertical deviation angle is 0 degree. When using the single-crane slide method or the double-crane to hoist a weight, the crane driver should cooperate with an operator in the collaborative monitoring point. For example, a crane driver cooperates with a traction machine driver, or a main crane driver cooperates with an auxiliary crane driver. The vertical deviation angles of the main and auxiliary cranes are inversely proportional to their load distributions. If the main and auxiliary cranes bear loads in a ratio of 6:1, the vertical deviation angle of auxiliary crane will advance 3 degrees while the vertical deviation angle of main crane will lag 0.5 degrees. That is, if the vertical deviation angle of the auxiliary crane satisfies the requirement, the vertical deviation angle of main crane also satisfies the requirement. Thus, the main and auxiliary cranes both are operated with the benchmark against which the auxiliary crane achieves a vertical lifting.

In one solution, the present invention provides a monitoring apparatus of crane collaborative hoisting vertical deviation angle, comprising:

a measuring platform fixed on the outside of the guard plate of the movable pulley of the lifting pulley block of a crane, and the measuring platform surface becomes a horizontal plane when the crane hoisting vertical deviation angle is 0 degree;

a dual-axis inclinometer fixed on the measuring platform surface to measure the angularity of the measuring platform surface relative to the horizontal plane in order to obtain the crane hoisting vertical deviation angle, the dual-axis inclinometer, which is preferably a dual-axis tilt angle sensor or a dual-axis digital inclinometer, detecting the angle of the measuring platform surface deviating from the horizontal plane along each sensing axis direction when the vertical deviation occurs, the angle detected being equal to the vertical deviation angle of the lifting pulley block along the corresponding direction, the dual-axis inclinometer measuring the vertical deviation angles both in the X-axis direction and in the Y-axis direction when a cross coordinate is established at the center of the measuring platform surface;

a wireless transmitter, also fixed on the outside of the guard plate of the movable pulley of the lifting pulley block of the crane, to transmit the dual-axis vertical deviation angle signals which are generated by the dual-axis inclinometer;

a wireless receiver as well as a corresponding control display positioned in the crane cab, the wireless receiver receiving the dual-axis vertical deviation angle signals, the control display processing the dual-axis vertical deviation angle signals into a crane hoisting vertical deviation angle and dynamically displaying the angle;

a portable wireless receiver as well as a corresponding portable control display placed in a collaborative monitoring point, the portable wireless receiver receiving the dual-axis vertical deviation angle signals, the portable control display processing the dual-axis vertical deviation angle signals into a crane hoisting vertical deviation angle and dynamically displaying the angle, the collaborative monitoring point comprising, preferably, at least one of a collaborative crane cab, a traction machine driver's monitoring point, and a hoisting commander's monitoring point.

In another solution, the present invention provides a monitoring apparatus of the hoisting vertical deviation angle for a crane, comprising:

a measuring platform fixed on the outside of the guard plate of the movable pulley of the lifting pulley block of the crane, said measuring platform satisfying the requirement that its surface is horizontal when the hoisting verticality deviation angle is 0 degree;

a dual-axis inclinometer, fixed on the surface of the measuring platform, measuring the angularity of the surface of the measuring platform relative to the horizontal plane to obtain the hoisting verticality deviation angle, the dual-axis inclinometer measuring the vertical deviation angles both in the X-axis direction and in the Y-axis direction when a cross coordinate is established at the center of the measuring platform surface, said dual-axis inclinometer being, preferably, a dual-axis tilt angle sensor or a dual-axis digital inclinometer in view of the development of advanced MEMS technology;

a wireless transmitter, also fixed on the outside of the guard plate of the movable pulley of the lifting pulley block of the crane, to transmit signals representing the dual-axis verticality deviation angle generated by the dual-axis inclinometer;

a wireless receiver enclosed in the cab of the crane to receive the said dual-axis verticality deviation angle signal;

a control display, also enclosed in the cab, used to process said angle signal into the crane hoisting verticality deviation angle and display the said angle.

Based on the monitoring apparatuses mentioned above, the present invention provides a control method controlling the hoisting vertical deviation angle for a crane, comprising the following steps:

(1) when using the single-crane rotation method to hoist a weight, on the basis of the crane hoisting vertical deviation angle displayed in the crane cab, the crane operator adjusts the crane hoisting speed in accordance with the crane rotational speed to eliminate verticality deviation;

(2) when using the single-crane slide method to hoist a weight, on the basis of the crane hoisting vertical deviation angle displayed in the crane cab, the crane operator adjusts the crane hoisting speed; on the basis of the crane hoisting vertical deviation angle displayed in the collaborative monitoring point (that is, the traction machine driver's monitoring point), the traction machine driver controls the traction in accordance with the crane hoisting speed to eliminate the verticality deviation;

(3) when using the double-crane to hoist a weight, the main and auxiliary cranes both are operated with the benchmark against which the auxiliary crane achieves a vertical lifting; on the basis of the auxiliary crane hoisting vertical deviation angle displayed in the auxiliary crane cab, the auxiliary crane operator adjusts the auxiliary crane hoisting speed; on the basis of the auxiliary crane hoisting vertical deviation angle displayed in the main crane cab, the main crane operator controls the main crane hoisting speed in accordance with the auxiliary crane hoisting speed to eliminate the auxiliary crane hoisting verticality deviation; as the main and auxiliary cranes synchronously hoist, both of them are still operated with the benchmark against which the auxiliary crane achieves vertical lifting.

It is the first time that the present invention puts forward the idea of fixing a measuring platform on the outside of the guard plate of the movable pulley of the lifting pulley block, setting a dual-axis inclinometer on the measuring platform surface to measure the vertical deviation angle of the lifting pulley block, and displaying the angle in the specified monitoring point (such as the crane cab, a collaborative crane cab, a traction machine driver's monitoring point and a hoisting commander's monitoring point) when the crane hoists a weight. Thus, the present invention can achieve crane vertical hoisting, especially overcome the risk of non-vertical collaborative hoisting by two cranes, and be applied to the entire single crane hoisting as well as double cranes collaborative hoisting.

BRIEF DESCRIPTION OF THE DRAWINGS

In FIG. 1, the sensor module and the wireless transmitting module are installed on the outside of the guard plate of the movable pulley of the lifting pulley block of the crane, while the wireless receiving module and the PC machine are installed in a specified monitoring point.

In FIG. 4, the reference numerals are as following: 11—Movable pulley, 12—Fixed pulley, 13—Hoist rope, 14—Guard plate, 15—Hook, 16—Jib, 17—Measuring platform, 18—Dual-axis inclinometer, 19—Wireless transmitter.

DETAILED DESCRIPTION OF THE INVENTION

Figure 1:
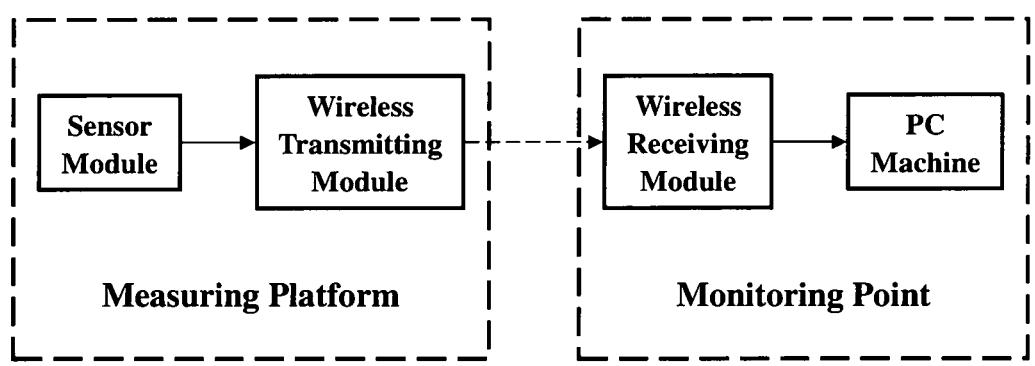
FIG. 1 is a block diagram showing the working of the monitoring apparatus, in which an embodiment of the present invention may be incorporated.
Figure 2:
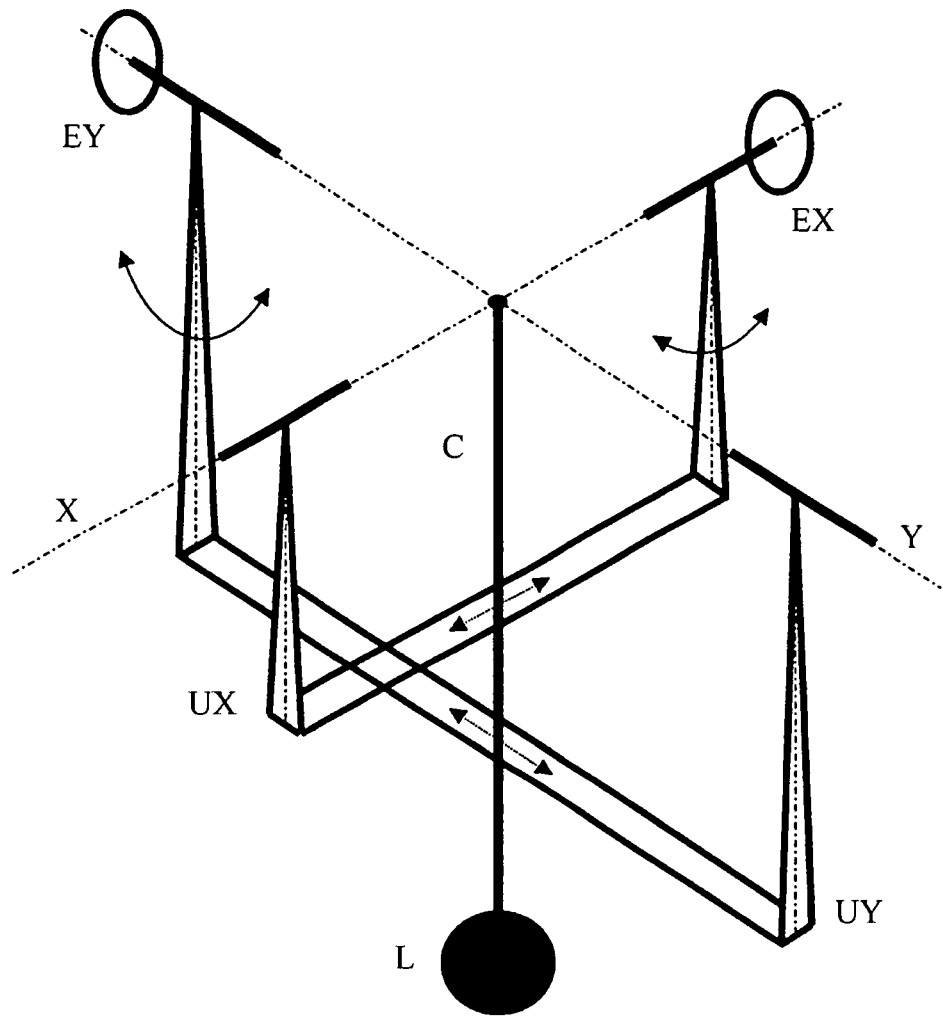
FIG. 2 is a schematic diagram of a prior art angular measurement device of the crane hook wire.
Figure 3:
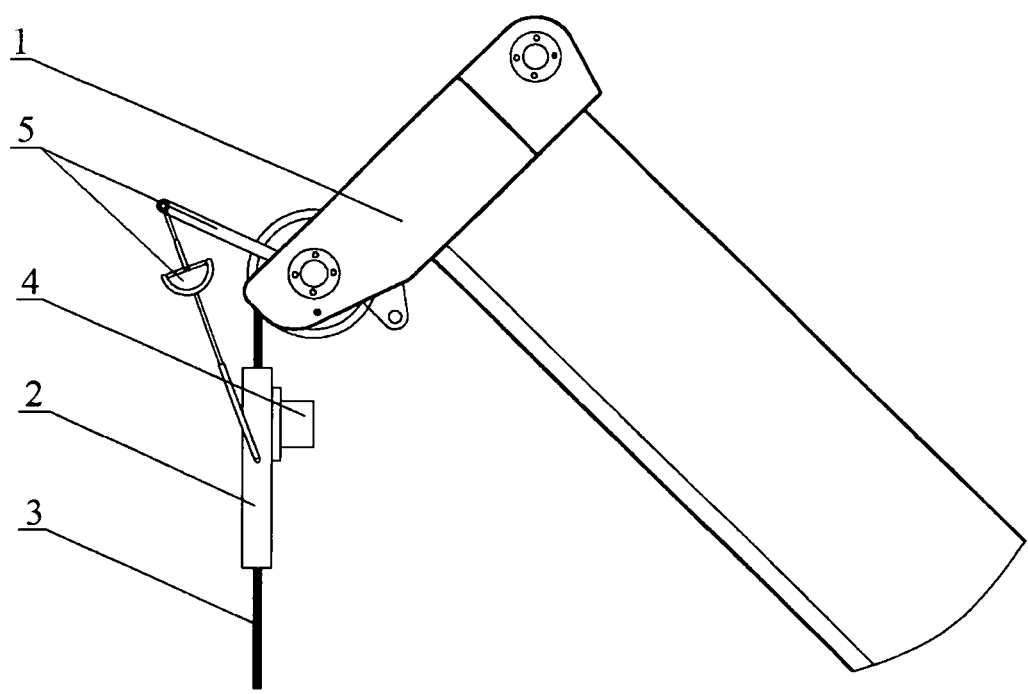
FIG. 3 is a structural schematic view of a prior art device for detecting the deviation angle of crane hook wire.
Figure 4:
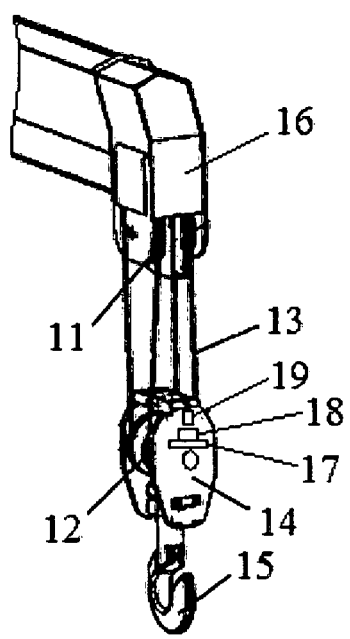
FIG. 4 is a structural schematic view of the apparatus, in which an embodiment of the present invention may be incorporated.

First, there is disclosed a monitoring apparatus of crane collaborative hoisting vertical deviation angle in one embodiment of the present application. The method for manufacturing this monitoring apparatus comprises the following steps:

(1) providing a Γ-shaped frame consisting of an upper flat plate connecting with a vertical plate, and a measuring platform matching with the upper flat plate, separately drilling three triangular connecting holes on the measuring platform and the corresponding positions of the upper flat plate, connecting the measuring platform to the upper flat plate by means of countersunk bolts and nuts, and setting adjustable gaskets on the outside of the bolts between the measuring platform and the upper flat plate, then welding three triangular short bolts on the outside (vacant site) of the guard plate of the movable pulley of the lifting pulley block of the crane, drilling three connecting holes on the corresponding positions of the vertical plate, and fixing the vertical plate of Γ-shape frame on the outside of the guard plate of the movable pulley by means of nuts, finally adjusting the measuring platform surface to be horizontal by adjusting the thickness of three gaskets between the measuring platform and the upper flat plate, when the crane hoisting vertical deviation angle is 0 degree;

(2) establishing a cross coordinate at the center of the measuring platform surface, fixing a dual-axis tilt angle sensor on the center of the measuring platform surface to measure the angularity of the measuring platform surface relative to the horizontal plane in order to obtain the crane hoisting vertical deviation angle, fixing a wireless transmitter (including antenna) on the outside of the guard plate of the movable pulley of the lifting pulley block of the crane to transmit the dual-axis vertical deviation angle signals generated by the dual-axis tilt angle sensor, and installing a nonmetal shell to protect the wireless transmitter by means of the bolts welded along the outside rim of the guard plate of the movable pulley;

(3) positioning a wireless receiver (including antenna) as well as a corresponding control display in the crane cab, where the wireless receiver receives the dual-axis vertical deviation angle signals and the control display processes the dual-axis vertical deviation angle signals into crane hoisting vertical deviation angle and dynamically displays the angle, placing a portable wireless receiver as well as a corresponding portable control display in a collaborative monitoring point, where the portable wireless receiver receives the dual-axis vertical deviation angle signals and the portable control display processes the dual-axis vertical deviation angle signals into a crane hoisting vertical deviation angle and dynamically displays the angle, the collaborative monitoring point comprising, preferably, at least one of a collaborative crane cab, a traction machine driver's monitoring point, and a hoisting commander's monitoring point.

As shown in FIG. 1, the circuit modules of this monitoring apparatus are mainly composed of one sensor module, one wireless transmitting module, at least one wireless receiving module and at least one PC machine. The sensor module and the wireless transmitting module are installed on the outside of the guard plate of the movable pulley of the lifting pulley block of the crane. The wireless receiving modules and the PC machines are installed in the specified monitoring points. The sensor module comprises a dual-axis tilt angle sensor and its signal conditioning circuit. The wireless transmitting module comprises a wireless transmitter and its A/D converting circuit as well as signal emission circuit. The wireless receiving module comprises a wireless receiver and its signal reception circuit as well as serial port circuit. The PC machine comprises the control display and its serial port communication circuit as well as an LED indication circuit.

Secondly, there is disclosed a monitoring apparatus of crane hoisting vertical deviation angle in another embodiment of the present application. The method for manufacturing this monitoring apparatus comprises the following steps:

(1) providing a Γ-shape frame consisting of an upper flat plate connecting with a vertical plate, and a measuring platform that matches with the upper flat plate, separately drilling three triangular connecting holes on the measuring platform and the corresponding positions of the upper flat plate, connecting the measuring platform to the upper flat plate by means of countersunk bolts and nuts, setting adjustable gaskets on the outside of the bolts between the measuring platform and the upper flat plate, then welding three triangular short bolts on the outside (vacant site) of the guard plate of the movable pulley of the lifting pulley block of the crane, drilling three connecting holes on the corresponding positions of the vertical plate, and fixing the vertical plate of Γ-shape frame on the outside of the guard plate of the movable pulley by means of nuts, lastly adjusting the measuring platform surface to be horizontal by adjusting the thickness of three gaskets between the measuring platform and the upper flat plate, when the crane hoisting vertical deviation angle is 0 degree;

(2) establishing a cross coordinate at the center of the measuring platform surface, fixing a dual-axis digital inclinometer on the center of the measuring platform surface to measure the angularity of the measuring platform surface relative to the horizontal plane in order to obtain the crane hoisting vertical deviation angle, fixing a wireless transmitter on the outside of the guard plate of the movable pulley of the lifting pulley block of the crane to transmit the dual-axis vertical deviation angle signals generated by the dual-axis digital inclinometer, installing a nonmetal shell to protect the wireless transmitter by means of the bolts welded along the outside rim of the guard plate of the movable pulley;

(3) positioning a wireless receiver as well as a corresponding control display in the crane cab, where the wireless receiver receives the dual-axis vertical deviation angle signals and the control display processes the dual-axis vertical deviation angle signals into a crane hoisting vertical deviation angle and dynamically displays the angle on the screen.

In a further embodiment of the present invention, a portable wireless receiver as well as a corresponding portable control display can also be placed in a collaborative monitoring point, where the portable wireless receiver receives the dual-axis vertical deviation angle signals, and the portable control display processes the dual-axis vertical deviation angle signals into a crane hoisting vertical deviation angle and dynamically displays the angle, the collaborative monitoring point comprises, preferably, at least one of a collaborative crane cab, a traction machine driver's monitoring point, and a hoisting commander's monitoring point.

Thirdly, there is disclosed a control method controlling the hoisting vertical deviation angle for a crane in an embodiment of the present application.

To reduce the risk of single crane non-vertical hoisting and two crane non-vertical collaborative hoisting, this control method in based on the monitoring apparatuses mentioned above, comprising the following steps.

(1) when using the single-crane rotation method to hoist a weight, on the basis of the crane hoisting vertical deviation angle displayed in the crane cab, the crane operator adjusts the crane hoisting speed in accordance with the crane rotational speed to eliminate the verticality deviation;

(2) when using the single-crane slide method to hoist a weight, on the basis of the crane hoisting vertical deviation angle displayed in the crane cab, the crane operator adjusts the crane hoisting speed; on the basis of the crane hoisting vertical deviation angle displayed in the collaborative monitoring point, the traction machine driver controls the traction in accordance with the crane hoisting speed to eliminate the verticality deviation;

(3) when using the double-crane to hoist a weight, the main and auxiliary cranes both are operated with the benchmark against which the auxiliary crane achieves vertical lifting; on the basis of the auxiliary crane hoisting vertical deviation angle displayed in the auxiliary crane cab, the auxiliary crane operator adjusts the auxiliary crane hoisting speed; on the basis of the auxiliary crane hoisting vertical deviation angle displayed in the main crane cab, the main crane operator controls the main crane hoisting speed in accordance with the auxiliary crane hoisting speed to eliminate the auxiliary crane hoisting verticality deviation; as the main and auxiliary cranes synchronously hoist, both of them are still operated with the benchmark against which the auxiliary crane achieves vertical lifting.

What is claimed is:

1. An apparatus for monitoring a hoisting verticality deviation angle of a crane, comprising:
    a measuring platform fixed on outside of a guard plate of a movable pulley of a lifting pulley block of the crane, said measuring platform satisfying the requirement that its surface is horizontal when the hoisting verticality deviation angle is 0 degree;
    a dual-axis inclinometer, fixed on the surface of the measuring platform, measuring an angularity of the surface of the measuring platform relative to a horizontal plane to obtain the hoisting verticality deviation angle;
    a wireless transmitter, also fixed on the outside of the guard plate of the movable pulley of the lifting pulley block of the crane, to transmit dual-axis verticality deviation angle signals representing dual-axis verticality deviation angles generated by the dual-axis inclinometer;
    a wireless receiver enclosed in a cab of the crane to receive said dual-axis verticality deviation angle signals;
    a control display, also enclosed in the cab of the crane, used to process said dual-axis verticality deviation angle signals into the hoisting verticality deviation angle and display said hoisting verticality deviation angle.

2. The apparatus according to claim 1, further comprising a portable wireless receiver and a corresponding portable control display, both of which being placed in a collaborative monitoring point, said wireless receiver receiving said dual-axis verticality deviation angle signals, said portable control display processing said dual-axis verticality deviation angle signals into the hoisting verticality deviation angle and dynamically displaying the hoisting verticality deviation angle.

3. The apparatus according to claim 2, wherein the collaborative monitoring point is a cab of another crane, a traction machine driver's monitoring point, or a hoisting commander's monitoring point.

4. The apparatus according to claim 2 or 3, wherein the dual-axis inclinometer is a dual-axis tilt angle sensor or a dual-axis digital inclinometer.

* * * * *